United States Patent
Wilson

(10) Patent No.: US 8,862,347 B2
(45) Date of Patent: Oct. 14, 2014

(54) MOTOR VEHICLE PERFORMANCE MONITORING SYSTEM AND METHOD

(75) Inventor: Thomas H. Wilson, Indianapolis, IN (US)

(73) Assignee: GM Global Technology Operations, LLC, Detroit, MI (US)

(*) Notice: Subject to any disclaimer, the term of this patent is extended or adjusted under 35 U.S.C. 154(b) by 1284 days.

(21) Appl. No.: 12/414,278

(22) Filed: Mar. 30, 2009
(Under 37 CFR 1.47)

(65) Prior Publication Data
US 2009/0281695 A1 Nov. 12, 2009

Related U.S. Application Data

(60) Provisional application No. 61/051,790, filed on May 9, 2008.

(51) Int. Cl.
| | | |
|---|---|---|
| *G06F 19/00* | (2011.01) |
| *G07C 5/00* | (2006.01) |
| *B60W 50/08* | (2012.01) |
| *B60W 40/12* | (2012.01) |
| *G07C 5/08* | (2006.01) |
| *G01M 15/05* | (2006.01) |
| *B60W 50/00* | (2006.01) |

(52) U.S. Cl.
CPC ............. *B60W 50/08* (2013.01); *G07C 5/085* (2013.01); *G01M 15/05* (2013.01); *G07C 5/004* (2013.01); *B60W 2050/0026* (2013.01); *F02D 2200/1004* (2013.01); *B60W 40/12* (2013.01)
USPC .................................. 701/54; 701/56; 701/101

(58) Field of Classification Search
CPC . B60W 30/1882; B60W 40/00; B60W 40/12; B60W 50/04; B60W 50/045; B60W 50/08; B60W 2050/0026; F02D 2200/10; F02D 2200/1002; F02D 2200/1004; F02D 2200/501; G07C 5/00; G07C 5/004; G07C 5/08; G07C 5/0808; G07C 5/0816; G07C 5/0825; G07C 5/085; G07C 5/12; G01M 15/05
USPC .......... 477/54, 168, 181; 701/104, 103, 54, 56
See application file for complete search history.

(56) References Cited

U.S. PATENT DOCUMENTS

| | | | |
|---|---|---|---|
| 6,165,102 A * | 12/2000 | Bellinger ........................ 477/54 |
| 2002/0183163 A1* | 12/2002 | Etchason et al. ............... 477/110 |
| 2004/0002806 A1* | 1/2004 | Bellinger ...................... 701/104 |
| 2004/0236492 A1* | 11/2004 | Yasui et al. .................... 701/103 |
| 2009/0037047 A1* | 2/2009 | Hawkins et al. ................ 701/36 |

* cited by examiner

*Primary Examiner* — James Trammell
*Assistant Examiner* — Jerrah Edwards

(57) ABSTRACT

A vehicle performance system and method for determining and displaying vehicle performance data includes a display device in communication with a transmission controller, an engine controller, and a plurality of vehicle condition sensors. The transmission controller calculates vehicle performance data from data signals sent by the plurality of vehicle condition sensors and from stored performance maps. The display device communicates the vehicle performance data to a user of the vehicle performance system.

4 Claims, 2 Drawing Sheets

MOTOR VEHICLE PERFORMANCE MONITORING SYSTEM AND METHOD

CROSS-REFERENCE TO RELATED APPLICATIONS

This application claims the benefit of U.S. Provisional Application No. 61/051,790, filed on May 9, 2008. The disclosure of the above application is incorporated herein by reference.

FIELD

The invention relates generally to a performance monitoring system and method for a motor vehicle, and more particularly to a performance monitoring system operable to calculate and communicate vehicle performance information.

BACKGROUND

The statements in this section merely provide background information related to the present disclosure and may or may not constitute prior art.

During the life of a motor vehicle, efficiency and performance issues may arise that require correction or maintenance. These efficiency and performance issues oftentimes are difficult to quantify, such as, for example, issues relating to engine power output and fuel consumption rate. In the past, accurate calculations of engine power and fuel consumption rate have required the use of expensive dynamometer equipment and several hours of testing. Accordingly, there is a need in the art for a vehicle performance monitoring system that is operable to determine and communicate vehicle performance information that is also cost and time effective.

SUMMARY

The present invention provides a vehicle performance system and method for determining and displaying vehicle performance data. The system includes a display device in communication with a transmission controller, an engine controller, and a plurality of vehicle condition sensors. The transmission controller calculates vehicle performance data from data signals sent by the plurality of vehicle condition sensors and from stored performance maps. The display device communicates the vehicle performance data to a user of the vehicle performance system.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 1:
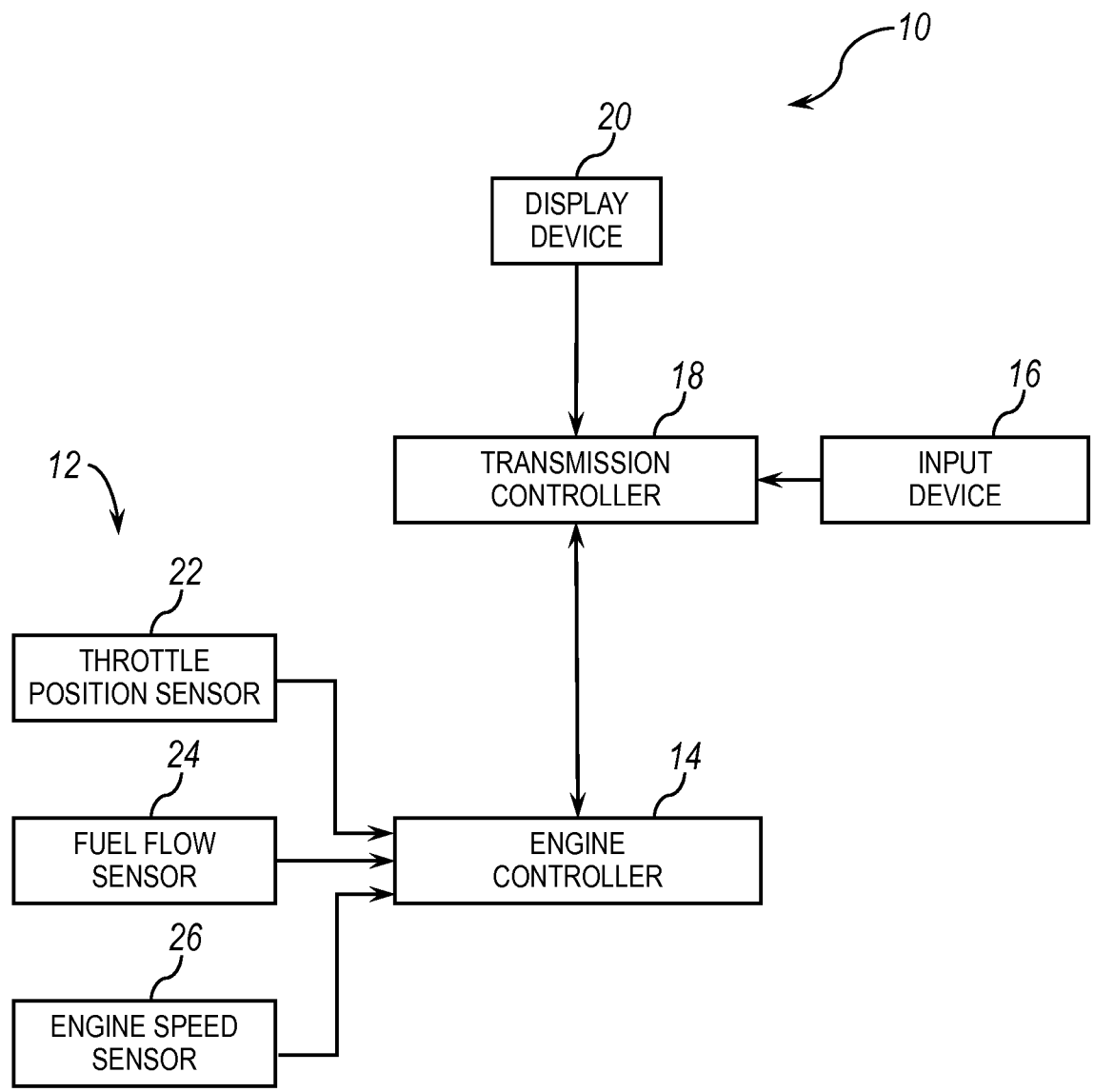
Figure 2:
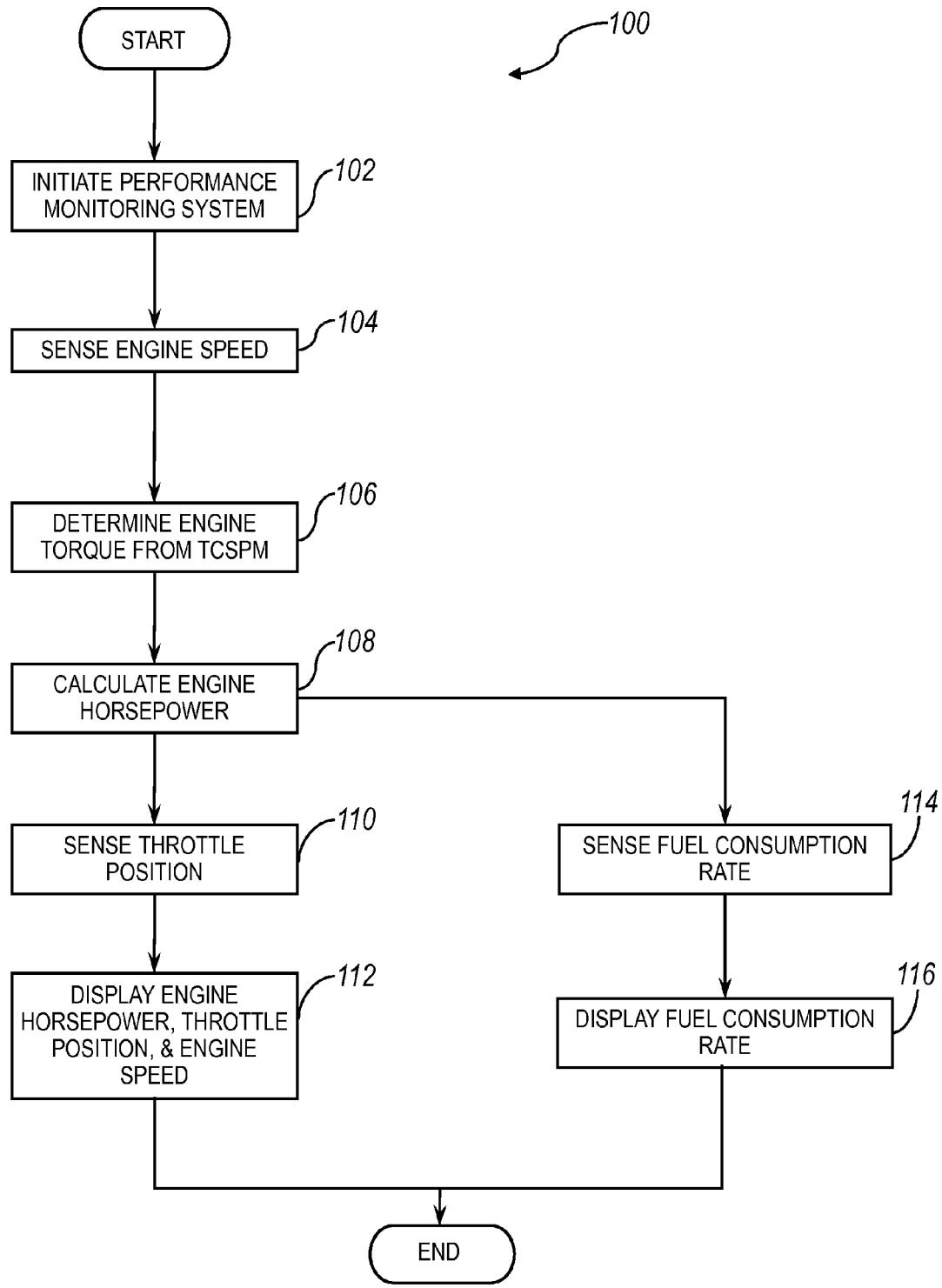

FIG. 1 is a schematic diagram of an embodiment of a motor vehicle performance monitoring system according to the principles of the present invention; and FIG. 2 is a flow chart of an embodiment of a method of operating the motor vehicle performance monitoring system of the present invention.

DETAILED DESCRIPTION

The following description is merely exemplary in nature and is not intended to limit the present disclosure, application, or uses.

With reference to FIG. 1, a performance monitoring system for use in a motor vehicle is generally indicated by reference number 10. The performance monitoring system 10 is operable to determine vehicle performance information and communicate the vehicle performance information to a user, as will be described in greater detail below. The performance monitoring system 10 generally includes a plurality of vehicle condition sensors 12, an engine controller 14, an input device 16, a transmission controller 18, and a display device 20.

The vehicle condition sensors 12 are coupled to various components in the motor vehicle and are operable to sense specific vehicle operating conditions. In the present embodiment, the plurality of vehicle condition sensors 12 include a throttle position sensor 22, a fuel flow sensor 24, and an engine speed sensor 26. However, it should be appreciated that the plurality of vehicle condition sensors 12 may include various other types of sensors without departing from the scope of the present invention. The types of sensors employed are dependent on the specific vehicle performance information determined and communicated by the vehicle performance system 10, as will be described in greater detail below. The throttle position sensor 22 is in communication with a throttle (not shown) in the motor vehicle and is operable to sense the position of the throttle. In a preferred embodiment, the position of the throttle is expressed as a percentage of how much the throttle is open or closed. The throttle position sensor 22 may take various forms without departing from the scope of the present invention. The fuel flow sensor 24 is in communication with a fuel system (not shown) in the motor vehicle and is operable to sense a fuel flow rate. The fuel flow sensor 24 may take various forms without departing from the scope of the present invention. The engine speed sensor 26 is in communication with an engine (not shown) in the motor vehicle and is operable to sense an engine output speed in rotations per minute (RPM). The engine speed sensor 26 may take various forms without departing from the scope of the present invention.

The engine controller 14 is preferably an electronic control device having a preprogrammed digital computer or processor, control logic, memory used to store data, and at least one I/O peripheral. The control logic includes a plurality of logic routines for monitoring, manipulating, and generating data. For example, these logic routines are operable to set various combustion parameters for the engine including, but not limited to, fuel injection timing, exhaust gas recirculation rates, fuel rail pressure, and pilot injection fuel quantity. However, other types of controllers may be employed without departing from the scope of the present invention. The engine controller 14 is in communication with the plurality of vehicle condition sensors 12. More specifically, the engine controller 14 is configured to receive data signals from the throttle position sensor 22 indicative of the position of the throttle, to receive data signals from the fuel flow sensor 24 indicative of the fuel flow rate or consumption rate of the fuel in the motor vehicle, and to receive data signals from the engine speed sensor 26 indicative of the output engine speed.

The input device 16 is operable to initiate the operation of the performance monitoring system 10. The input device 16 can take many forms, for example, an electronic shift selector or other shifting device, a switch or button located on the instrument panel of the motor vehicle, or a diagnostic scanning device coupled to the motor vehicle during a maintenance or repair session.

The transmission controller 18 is preferably an electronic control device having a preprogrammed digital computer or processor, control logic, memory used to store data, and at least one I/O peripheral. The control logic includes a plurality of logic routines for monitoring, manipulating, and generating data. For example, these logic routines are operable to set various operating parameters for a transmission in the motor vehicle including, but not limited to, selective clutch engagement to initiate gear shifts, solenoid activation, and torque converter clutch application. However, other types of controllers may be employed without departing from the scope of the present invention. The memory of the transmission controller 18 is operable to store a torque converter stall performance map (TCSPM). The TCSPM is a plot or table of specific torque converter performance data during a stall condition (i.e., when the engine is applying power to the pump of the torque converter but the turbine of the torque converter cannot rotate as when, for example, the transmission is in a forward gear but the motor vehicle is prevented from moving due to application of the brakes). An example of a TCSPM includes torque data plotted versus vehicle speed data for a variety of gear ratios. The transmission controller 18 is in communication with the engine controller 14 and the input device 16. More specifically, the transmission controller 18 is configured to receive data signals from the engine controller 14 indicative of the data sensed by the plurality of vehicle condition sensors 12 including the position of the throttle, the fuel flow rate of the motor vehicle, and the output engine speed. The transmission controller 18 is also configured to receive data signals from the input device 18 indicative of whether to initiate or terminate the operation of the performance monitoring system 10.

The display device 20 is in communication with the transmission controller 18. The display device 20 is operable to communicate vehicle performance information calculated by the performance monitoring system 10 to a user of the performance monitoring system 10. For example, the display device 20 may be a vehicle display located in the instrument panel operable to display a digital message or a diagnostic scanning device or reader connected to the transmission controller 18 during maintenance or repair. However, various other kinds of display devices may be employed without departing from the scope of the present invention.

Turning now to FIG. 2 and with continued reference to FIG. 1, a method of determining and displaying vehicle performance information using the performance monitoring system 10 is generally indicated by reference number 100. The method 100 begins at step 102 when the operation of the performance monitoring system 10 is initiated by a data signal received by the transmission controller 18 from the input device 16. At step 104 the engine speed sensor 26 senses the engine speed of the motor vehicle. The engine speed is communicated to the engine controller 14 and then to the transmission controller 18.

At step 106 the transmission controller 18 determines the engine torque using the TCSPM stored in memory. At step 108 the transmission controller 18 calculates the engine horsepower from the engine speed sensed in step 104 and the engine torque determined in step 106.

At step 110 the throttle position sensor 22 senses the position of the throttle of the motor vehicle. The throttle position is communicated to the engine controller 14 and then to the transmission controller 18. At step 112 the transmission controller 18 communicates the engine horsepower, the engine speed, and the throttle position to the display device 20 in order to communicate the vehicle performance information to a user of the performance monitoring system 10.

At step 114 the fuel flow sensor 24 senses the fuel consumption rate of the motor vehicle. The fuel consumption rate is communicated to the engine controller 14 and then to the transmission controller 18. At step 116 the transmission controller 18 communicates the fuel consumption rate to the display device 20 in order to communicate the vehicle performance information to a user of the performance monitoring system 10. It should be appreciated that the display device 20 may display other vehicle performance data without departing from the scope of the present invention.

The vehicle performance information that includes the throttle position, engine speed, engine horsepower, and fuel consumption rate displayed by the display device 20 allows the user of the performance monitoring system 10 to quickly and efficiently determine the status or health of the motor vehicle. The vehicle performance information can be provided during various vehicle operating conditions, for example, by placing the transmission in a drive range, holding the motor vehicle stationary by applying the brakes, and controlling the position of the throttle. The vehicle performance information may be used as part of a preventative vehicle maintenance plan, to evaluate driver complaints, and to aid in engine overhaul decisions.

The description of the invention is merely exemplary in nature and variations that do not depart from the gist of the invention are intended to be within the scope of the invention. Such variations are not to be regarded as a departure from the spirit and scope of the invention.

I claim:

1. A method for monitoring performance data for a motor vehicle, the method comprising:
   sensing a speed of an engine in the motor vehicle using an engine speed sensor;
   determining an engine torque from a torque converter stall performance map stored in a controller of the motor vehicle, wherein the torque converter stall performance map includes engine torque plotted versus vehicle speed for a plurality of gear ratios;
   determining an engine horsepower based on the sensed speed of the engine and the engine torque;
   sensing a position of an engine throttle of the engine from a range of engine throttle positions using a throttle position sensor;
   sensing a fuel consumption rate of the engine using a fuel flow sensor;
   displaying the engine horsepower, the position of the engine throttle, the speed of the engine, and the fuel consumption rate in real time during operation of the motor vehicle; and
   diagnosing an engine performance based on the displayed engine horsepower, the position of the engine throttle, the speed of the engine, and the fuel consumption rate.

2. The method of claim 1 wherein determining the engine torque further comprises determining the engine torque from torque converter performance data from the torque converter stall performance map during a stall condition.

3. The method of claim 2 wherein the stall condition exists when a turbine of a torque converter cannot rotate and the motor vehicle is prevented from moving due to application of a brake.

4. The method of claim 3 further comprising applying torque to a pump of the torque converter when a transmission of the motor vehicle is in a forward gear during the stall condition.

* * * * *